United States Patent [19]

Fung

[11] Patent Number: 4,467,045
[45] Date of Patent: Aug. 21, 1984

[54] REDISPERSION OF IR CATALYSTS BY LOW TEMPERATURE REDUCTION STEP

[75] Inventor: Shun C. Fung, Bridgewater, N.J.

[73] Assignee: Exxon Research and Engineering Co., Florham Park, N.J.

[21] Appl. No.: 428,927

[22] Filed: Sep. 30, 1982

[51] Int. Cl.³ .................... B01J 23/96; B01J 23/46; C10G 35/09; C10G 35/085
[52] U.S. Cl. .................... 502/35; 208/140; 502/36; 502/37; 502/230
[58] Field of Search .................... 252/415; 208/140; 502/35, 36, 37, 230

[56] References Cited

U.S. PATENT DOCUMENTS

| | | |
|---|---|---|
| 3,622,520 | 11/1971 | Hayes . |
| 3,625,860 | 12/1971 | Condrasky . |
| 3,904,510 | 9/1975 | Sinfelt et al. . |
| 3,939,061 | 2/1976 | Paynter et al. . |
| 3,941,682 | 3/1976 | Kmak et al. .................... 252/415 |
| 3,941,716 | 3/1976 | Paynter . |
| 3,943,052 | 3/1976 | Kmak et al. . |
| 3,981,823 | 9/1976 | Yates . |
| 4,046,673 | 9/1977 | Paynter et al. . |
| 4,159,938 | 7/1979 | Lewis . |
| 4,172,817 | 10/1979 | Yates et al. . |
| 4,359,400 | 11/1982 | Landolt et al. .................... 208/140 |

FOREIGN PATENT DOCUMENTS

| | | |
|---|---|---|
| 57551 | 11/1982 | European Pat. Off. . |
| 2757337 | 8/1975 | France . |
| 2290953 | 11/1975 | France . |
| 1484372 | 9/1977 | United Kingdom . |
| 1516518 | 7/1978 | United Kingdom . |

Primary Examiner—P. E. Konopka
Attorney, Agent, or Firm—Robert J. North

[57] ABSTRACT

A process is described for the redispersion of iridium-containing catalysts involving a low temperature hydrogen reduction step, i.e., from 190° C. up to about 250° C. after a coke burn-off. The low temperature reduction step allows milder conditions during subsequent halogen redispersion.

10 Claims, 1 Drawing Figure

X-RAY SPECTRA OF AN Ir CONTAINING CATALYST
UNDER VARIOUS TREATMENT CONDITIONS (A) FRESH CATALYST AIR CALCINED AT 540°C.

(B) REDUCTION OF (A) WITH H₂ AT 455°C.

(C) REDUCTION OF (A) WITH H₂ AT 205°C.

2θ

REDISPERSION OF IR CATALYSTS BY LOW TEMPERATURE REDUCTION STEP

BACKGROUND OF THE INVENTION

Iridium-containing catalysts, or catalysts comprising, e.g., composites of platinum and iridium with an inorganic oxide base, particularly alumina, are significantly more active in the production of $C_5+$ gasoline during reforming than a catalyst comprising platinum without iridium. Though the activity maintenance of the iridium-containing catalysts is excellent, a progressive decline in activity does occur due to the presence of carbonaceous deposits on the surface of the catalysts. Reactivation of the deactivated catalysts is generally accomplished a burning-off the coke deposits with dilute oxygen at a flame front temperature of 425° to 480° C. This high temperature decoking leads to a severe loss in the surface area of the supported metal particles and particularly, the iridium component agglomerates, to relatively large $IrO_2$ crystallites with crystal diameters in excess of 300 Å. Reduction of the $IrO_2$ agglomerate-containing catalysts at a temperature higher than 345° C. produces Ir metallic crystallites in excess of 200 Å. The activity of such catalysts is substantially lowered as a result of the loss of metal surface area.

Partial redispersion of the Ir agglomerates is possible by contacting the reduced catalyst with halogen or halogen-containing gaseous mixtures. Total redispersion of the iridium agglomerates is obtained through multiple cycle treatments of (a) pre-reduction at high temperature; and (b) halogen contact. However, this procedure is time consuming and requires a large excess of chlorine.

SUMMARY OF THE INVENTION

The present invention describes a process which greatly improves the redispersion of Ir agglomerates. It has been discovered that a low temperature reduction of the $IrO_2$ agglomerate-containing catalysts produces small Ir metallic particles which exhibit no X-ray diffraction pattern. The FIGURE shows the X-ray diffraction patterns of an $IrO_2$ agglomerate-containing catalyst (FIG. 1A) under two different reduction conditions. Iridium crystallites of 380 Å are obtained from 480 Å $IrO_2$ agglomerates after the catalyst has been reduced at 850° F. (FIG. 1B). In contrast, the X-ray diffraction pattern taken on the 205° C. reduced catalyst (FIG. 1C) fails to show any lines corresponding to iridium. Indeed, its X-ray diffraction pattern is very similar to that of a fresh catalyst.

The low temperature reduction apparently nucleates a large number of Ir metal centers before the $IrO_2$ particle is completely reduced. It is therefore reasonable to expect the large $IrO_2$ particle decomposes to a large number of individual metal particles closely grouped together. These particles are in the order of 80 Å and lower and therefore exhibit no distinct X-ray lines. Redispersing these small Ir particles is expected to have a substantial advantage over the large Ir agglomerates.

In accordance with this invention, there is provided a process for reactivating an agglomerated iridium oxide-containing catalyst comprising the steps of:

(a) contacting said agglomerated catalyst with an atmosphere comprising elemental hydrogen, at a temperature in the range of about 190° C. up to about 250° C. and a pressure of about 0.1 to 2.0 MPa for a sufficient time to substantially convert said iridium oxide to metallic iridium; and (b) contacting said metallic iridium from step (a) with an atmosphere comprising elemental halogen at a temperature in the range of about 450° to 600° C. for a sufficient time to effect about a 70 to 100 percent redispersion of said metallic iridium.

BRIEF DESCRIPTION OF THE FIGURE

The FIGURE shows the X-ray diffraction patterns of an $IrO_2$ agglomerate-containing catalyst (A) under two different reduction conditions: iridium crystallites of 380 Å are obtained from 480 Å $IrO_2$ agglomerates after the catalyst has been reduced at 455° C. (B); the X-ray diffraction pattern taken on the 205° C. reduced catalyst (FIG. C) fails to show any lines corresponding to iridium.

DESCRIPTION OF THE INVENTION AND PREFERRED EMBODIMENTS

Figure 1:
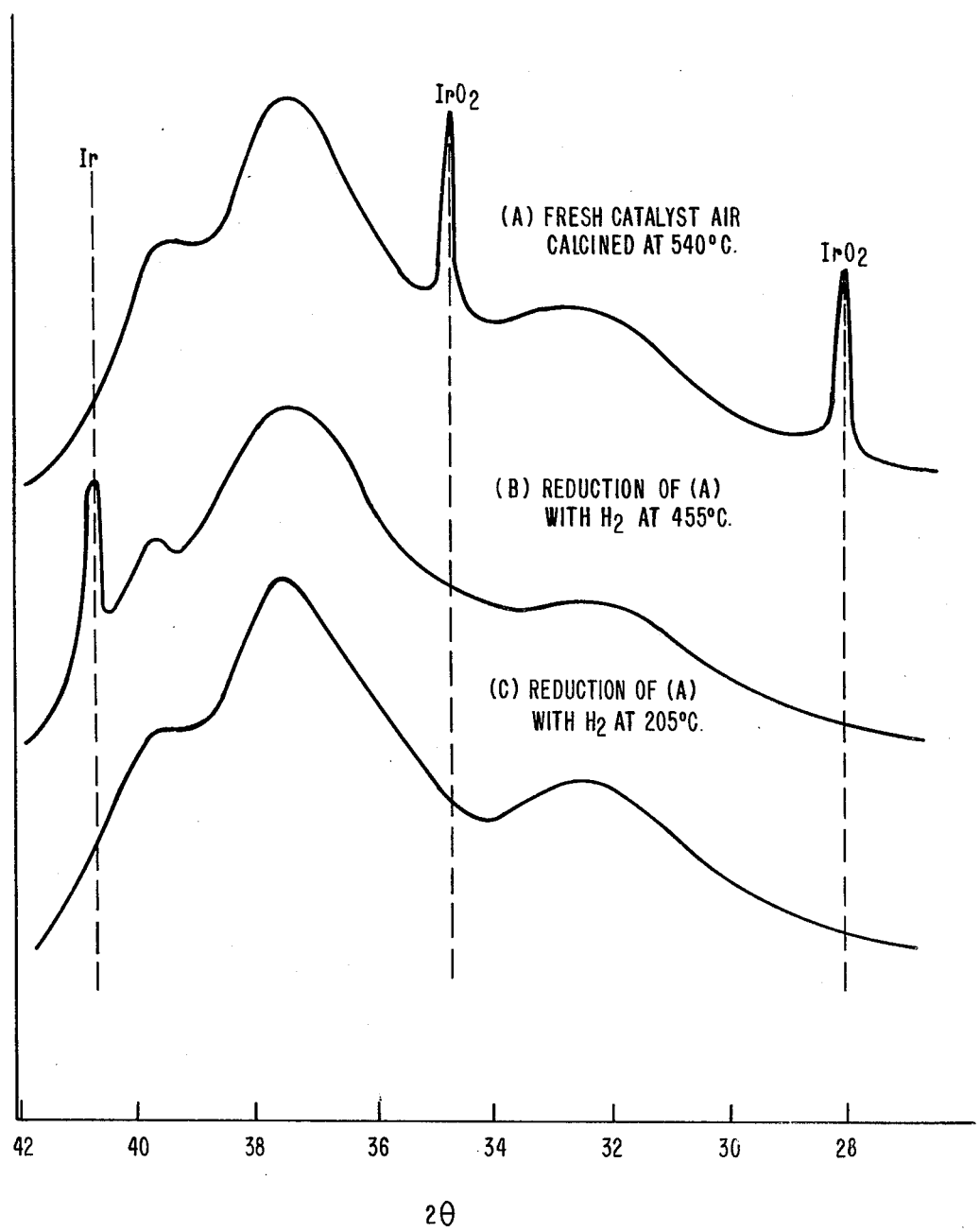

Catalysts which can be treated by the subject process include generally, iridium-containing catalysts, with and without co-catalysts, preferably being supported. Other metallic co-catalysts, which can be present with iridium which are applicable in the process include metals such as, for example, as platinum, rhodium, palladium mixtures thereof and the like. The metals can be present in bimetallic, trimetallic combinations and higher combinations, as alloys or physical mixtures on the same support particles of where the metals are individually present on separate support particles. Preferred metal combinations in the catalyst for treatment by the subject process are platinum-iridium.

The metals can be supported on a suitable support, which is conventional, with the proviso that the support is stable during the pretreatment process and does not undergo any deleterious reactions. Representative examples include silica, zeolites, alumina, silica-alumina, zirconia, alumina-zirconia, mixtures thereof, and the like. In general, the active metallic components, if supported, are present in an amount of preferably up to about 10 weight percent of the supported catalysts.

A preferred catalyst which can be reactivated in the process is agglomerated platinum-iridium, preferably supported on alumina.

By the term, "agglomerated catalysts", as used herein, is meant a supported or unsupported catalyst containing iridium oxide singly, or in combination with other metals described herein, in the agglomerated state, sufficient to reduce the catalytic activity of the metal catalyst. The agglomerated iridium oxide can be present due to the result of oxygen burn-off of coke deposits which then must be reduced to metallic iridium by hydrogen gas.

Coked catalysts are usually industrially decoked by an oxygen burn-off of carbon deposits. Generally, a typical used catalyst from industrial operation may contain up to about 6 weight % of carbon deposits and may be agglomerated after the decoking step up to about a 100% extent as evidenced by X-ray diffraction. Generally, depending on the conditions used in the coke burn, carbon deposits remaining may be present in about 0.05 to 1.0 weight percent of the catalyst, taken as the dry catalyst. In general, the agglomerates may be greater than about 50 Å and up to about 100 Å and greater in crystallite size. Decoking of the catalyst may be conducted under a variety of conditions, but is generally conducted by heating in an atmosphere containing 0.01 to 10 volume % $O_2$ at a temperature of about 400° to 550° C., to remove surface and embedded carbon deposits, and particularly "active" carbon deposits which can react with halogen during the redispersion step to form halogenated species which are not readily removed from the catalyst surface.

The first step in the subject process is wherein said partially or completely decoked agglomerated iridium oxide catalyst is treated with a reducing atmosphere, generally comprising hydrogen gas to reduce the metal oxides formed during decoking, and as a further aid in removing residual active carbon deposits from the decoking step. Other reducing or inert gases may also be present including nitrogen, helium and the like. The reducing step is generally conducted by contacting the catalyst at an elevated temperature generally in the range of about 190° C. up to about 250° C., preferably about 200° to 240° C. in a reducing atmosphere comprising above about one volume % hydrogen gas or above, for a time to substantially reduce metal oxides present to the free metal as evidenced by the absence of metal oxide lines in the X-ray diffraction pattern. Larger and smaller volume percentages of hydrogen can also be effectively used.

Preferred conditions in the reducing step are the use of hydrogen as the reducing gas in a reducing atmosphere comprising essentially hydrogen, at a volume concentration of 0.05 to 5 volume percent and a pressure of about 0.1 to 2.0 MPa, and an inert gas carrier such as nitrogen or helium, particularly preferred at a temperature of about 200° to 240° C. for a time sufficient to achieve a substantial reduction of the iridium oxide and other metal oxide to the free metals. By the term "substantially reduce" is meant a reduction in the numerical amount of iridium oxides present by about 70–100% and preferably about 90–100%. Generally, time requirements for the reduction will be in the range from about one to several hours depending on the process conditions. Shorter and longer times are also applicable.

Following the reduction step which does not require a subsequent halide pretreatment step, the catalyst is then subjected to a halogen redispersion step by contacting the catalyst with a stream comprising elemental halogen gas. Elemental halogen gases applicable are fluorine, chlorine, bromine and iodine with chlorine being a preferred embodiment.

The halogen redispersion is generally carried out at a temperature of about 450° to 600° C. and preferably about 500° to 540° C. Generally, the halogen atmosphere is introduced at the same temperature at which reduction is carried out and then slowly raised to the 500° to 540° C. range.

The gaseous halogen atmosphere may also contain inert gases such as nitrogen of helium as carrier gases, and also carbon dioxide from combustion processes, and also water vapor for corrosion inhibition and if present is in an amount of about 0.05 to 2 volume percent.

The gaseous halogen atmosphere can also contain elemental oxygen as a redispersion aid and if present, is present in an amount of about 0.05 to 25 volume percent. Preferably, elemental oxygen is present in a concentration of about 0.2 to 21 volume percent. Preferred is wherein elemental halogen and elemental oxygen are present in a volume ratio of about 0.5 to 10, respectively, and a particularly preferred range is 0.2 to 5 v/v. The presence of elemental oxygen also serves as an aid in removing small quantities of carbon deposits which may remain after the initial decoking step.

Halogen redispersion is generally conducted until breakthrough occurs, as evidenced or detected for example, by a starch-iodide indicator. Generally, this requires about 0.5 to 2 hours of halogen treatment for used catalyst, which depends upon flowrate, halogen concentration in the feedstream, and amount of catalyst. Generally, however, slightly longer times of halogen treatment are required for substantially complete redispersion as evidenced by the absence of crystalline metal or metal oxide lines in the X-ray diffraction patterns. Preferably a time of about 30 to 90 minutes past breakthrough, i.e., substantially past breakthrough, is necessary for substantially complete redispersion.

Operation past breakthrough of halogen is preferred to avoid redispersion gradients along the catalyst bed of redispersed iridium metal. Where gradients are present, usually redispersion levels of iridium metal are high at the front part (entrance) of the reactor but decrease towards the tail (exit) of the reactor.

By carrying out the process described herein substantially complete redispersions of iridium oxide-containing catalysts have been achieved, as described in the following Examples, and particularly those of platinum-iridium on alumina used in hydrocarbon reforming operations. In the latter case, 70 to 100 percent redispersion of both the platinum and iridium agglomerated metals have been achieved in the process.

By the term "substantially complete redispersion" as used herein, is meant redispersion values, as determined by X-ray diffraction, of greater than about 55 numerical percent and preferably about 70 to 100 numerical percent of the iridium on the catalyst surface, also including other metals where present.

Apparatus useful for carrying out the subject process will be conventional in the art and whether operating on a laboratory scale, pilot plant or full commercial plant scale, the apparatus will be obvious to one skilled in the art.

In practice, following successful redispersion of iridium on the catalyst surface, a reduction of halide to about 1.0 weight percent is carried out prior to the actual reforming process since excess halide, at this stage, leads to cracking of the liquid hydrocarbon fraction to undesirably smaller hydrocarbon fragments. This reduction can be accomplished by a wet hydrogen stream, for example, which also serves to convert all of the metal species present after redispersion to the metallic state prior to use in a reforming process.

The following examples are illustrative of the best mode of carrying out the instant invention as contemplated by the inventors and should not be construed as being limitations on the scope or spirit of the instant invention.

COMPARATIVE EXAMPLE

A run was made wherein a reactor was charged with about 60 grams of 100% agglomerated, coke-free, platinum-iridium catalyst. It contained 0.3 wt. % platinum and 0.3 wt. % iridium, based on the total weight of the catalyst. The catalyst ws divided into three approximately equal sections with a quartz wool plug as a spacer between the sections. The catalyst in Section 1 was at the entry of the reactor and the catalyst in Section 3 was at the reactor exit.

The catalyst was treated with a gas mixture of 20% hydrogen in helium at one atmosphere for two hours at 520° C. The hydrogen was purged from the catalyst bed with helium. The temperature of the catalyst bed was cooled to 200° C. The catalyst was then treated with a gas mixture of about 1.2% chlorine in helium for about 40 minutes. The temperature of the catalyst was brought back to 520° C. This treatment was continued at 520° C. until chlorine was detected at the reactor exit. At this moment, about 12% oxygen was added to the gas stream and the process continued for an additional 30 minutes. The results are given in Table I below.

TABLE I

|  | Prior to treat | After Treat | | |
| --- | --- | --- | --- | --- |
|  |  | Section (1) | Section (2) | Section (3) |
| % Iridium Agglomeration | 100 | 70 | 83 | 69 |
| % Redispersion | — | 30 | 17 | 31 |

EXAMPLE 1

The catalyst of the Comparative Example was treated substantially the same except that the hydrogen reduction step was carried out at 200° C. The results are given in Table II below.

TABLE II

|  | Prior to treat | After Treat | | |
| --- | --- | --- | --- | --- |
|  |  | Section (1) | Section (2) | Section (3) |
| % Iridium Agglomeration | 100 | 27 | 27 | 38 |
| % Redispersion | — | 73 | 73 | 62 |

Comparing Table I and II, one notices that two to three times higher metal redispersion is obtained in the reactivation process when the reduction step was carried at 200° C. Significantly below 200° C., at 175° C. iridium oxide does not completely reduce, and above about 250° C. large Ir metal agglomerates are formed during reduction, as is indicated by the presence of Ir metal peaks in the X-ray diffraction pattern. Therefore, the small iridium crystallites obtained at 200° C. reduction greatly improved the redispersion process during the chlorine treat step.

What is claimed is:

1. A process for reactivating an agglomerated iridium oxide-containing catalyst comprising the steps of:
   (a) contacting said agglomerated catalyst with an atmosphere comprising elemental hydrogen, at a temperature in the range of about 190° C. up to about 250° C. and a pressure of about 0.1 to 2.0 MPa for a sufficient time to substantially convert said iridium oxide to metallic iridium which after reduction is not evidenced by X-ray diffractometry; and
   (b) contacting said metallic iridium from step (a) with an atmosphere comprising elemental halogen at a temperature in the range of about 450° to 600° C. for a sufficient time to effect about a 70 to 100% redispersion of said metallic iridium.

2. The process of claim 1 wherein said agglomerated iridium-containing catalyst is present on a catalyst support selected from silica, zeolite, alumina, silica-alumina, zirconia, alumina-zirconia and mixtures thereof.

3. The process of claim 1 wherein said agglomerated catalyst further contains a metal cocatalyst selected from platinum, rhodium, palladium and mixtures thereof.

4. The process of claim 1 wherein said agglomerated catalyst is platinum-iridium supported on alumina.

5. The process of claim 1 wherein the temperature in step (a) is in the range of about 200° to 240° C.

6. The process of claim 1 wherein said elemental halogen in step (b) is chlorine.

7. The process of claim 6 wherein said atmosphere in step (b) also contains elemental oxygen.

8. The process of claim 7 wherein said chlorine and oxygen in step (b) are present in a volume ratio in the range of about 0.05 to 10.

9. The process of claim 1 wherein said temperature in step (b) is in the range of about 500° to 540° C.

10. A process for reactivating an agglomerated platinum-iridium on alumina catalyst, containing platinum and iridium oxides, comprising the steps of:
   (a) contacting said agglomerated catalyst with a hydrogen atmosphere at a temperature in the range of about 200° to 240° C., and a pressure of about 0.1–2 MPa, for a sufficient time to substantially reduce said oxides of platinum and iridium to the respective metals and wherein said iridium metal after reduction is not evidenced by X-ray diffractometry;
   (b) redispersing the metallic iridium and platinum from step (b) by contact with an atmosphere comprising elemental chlorine and elemental oxygen in a volume ratio of about 0.2 to 5 at a temperature in the range of about 500° to 540° C., and a pressure of about 0.1–2 MPa for a time sufficient to effect about a 70–100% redispersion of both metallic platinum and iridium.

* * * * *